United States Patent Office 3,451,651
Patented June 24, 1969

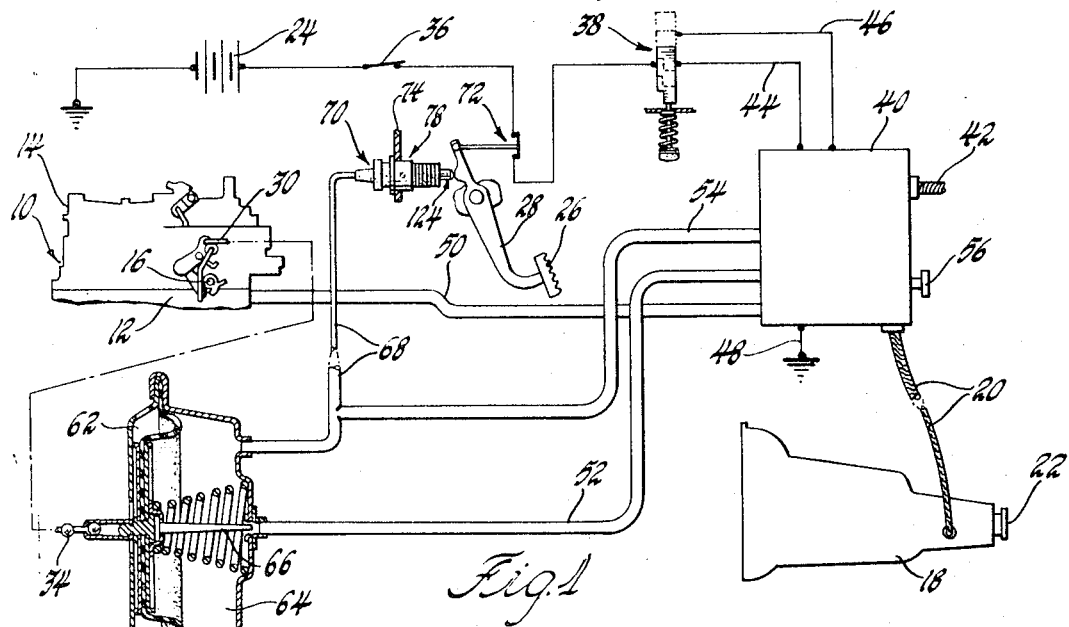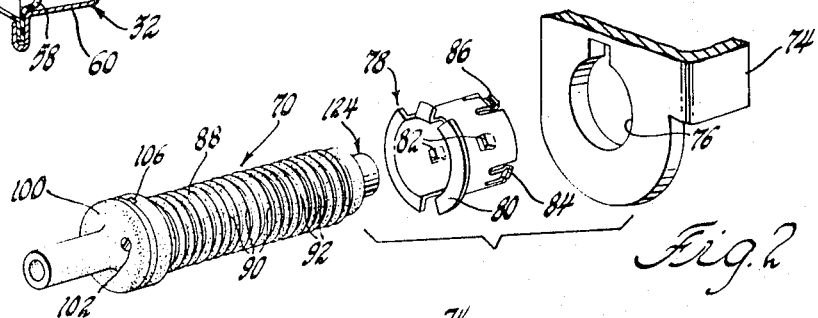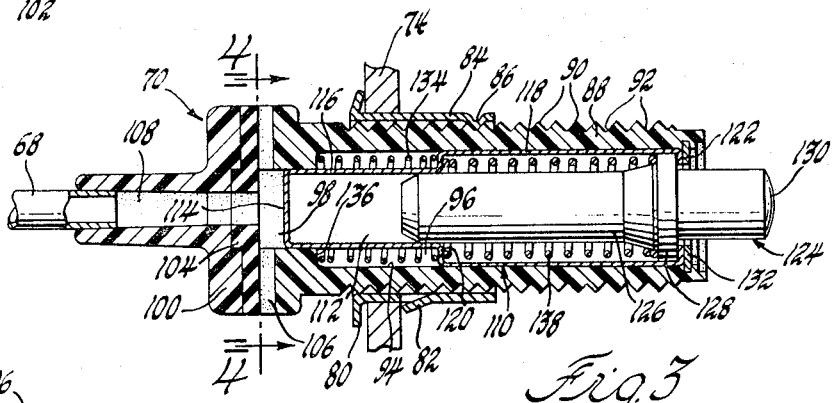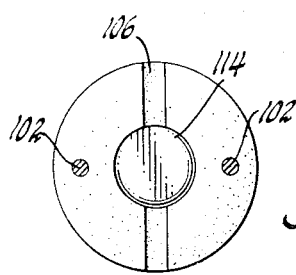

3,451,651
FLUID CONTROL VALVE ASSEMBLY
Gerald L. Rood, Pontiac, Mich., assignor to General Motors Corporation, Detroit, Mich., a corporation of Delaware
Filed Oct. 5, 1966, Ser. No. 584,407
Int. Cl. F16k *31/62, 31/46*
U.S. Cl. 251—77                                     3 Claims

ABSTRACT OF THE DISCLOSURE

A fluid control valve assembly in which the valve is releasably held seated by suitable holding means controlled by a control member such as a brake pedal or the like, the holding means being movable, upon release, by releasing movement of the control member, through a first range of movement away from the valve seat while continuing to hold the valve seated on the valve seat, and movable through a second continuing range of movement away from the valve seat, as the control member continues to release the holding means, to move the valve away from the valve seat. The control valve assembly requires mounting with quick and accurate adjustment relative to the control member so that the control member may move with a determined amount of permissive movement before the valve is unseated. The mounting means includes a mounting bracket and a series of annular ridges formed on the body of the valve assembly and spring detent means receiving the ridged portion of the valve body and securing the valve body to the mounting bracket so that the valve body may be quickly pressed into position with a ratcheting action. The annular ridges may have a helically threaded conformation so that after rough positioning of the valve assembly in a ratcheting manner a final positioning operation may be performed by rotating the valve assembly.

---

The invention relates to a valve assembly for controlling the flow of fluid, and more particularly to a valve assembly which has a normally open valve position and a closed valve position, and means holding the valve closed during the time that a part of the valve opening movement of a valve control member takes place.

The valve assembly is particularly adapted for control of air pressures, one of which is atmospheric air pressure. In one of its contemplated uses the valve assembly is connected as part of a pneumatically operated vehicle road speed control system so that it acts as a spoiler valve to pneumatically deactivate the system upon actuation of a vehicle control member such as the vehicle brake pedal. A valve assembly embodying the invention, when utilized in such a system, is so positioned as to be held closed while the vehicle brake pedal is in the released position and to be so actuated that the valve will open when the brake pedal is moved to apply the vehicle brakes. In order to permit slight movement of the vehicle brake pedal before the valve is opened, the valve structure includes means holding the valve closed until the valve actuating member has moved a predetermined distance in the valve opening direction. This is accomplished by having caged springs acting on the valve and the valve actuating member, with one spring having heavier preload than the other spring so that the valve remains seated on the valve seat until this additional preload is removed by movement of the valve actuating member in response to depression of the brake pedal. In order to properly position the valve assembly relative to the brake pedal it is provided with a mounting arrangement which will hold the assembly in an adjusted position, with adjustment being made easily and positively. This is accomplished by providing a spring ratchet mounting arrangement wherein the valve assembly may be moved toward and away from the brake pedal in ratcheting increments to obtain the desired valve assembly position relative to the released position of the brake pedal. The ratchet teeth may be formed as ridges on the exterior of the valve body and may be either annular or in a threaded form. When annular ridges are provided the valve body is moved so that a spring ratchet snaps over the ridges. When threaded ridges are provided, the same spring ratcheting arrangement may be used, with finer adjustments being made by rotation of the valve body to thread the body relative to the spring ratchet.

In the drawing:

FIGURE 1 schematically illustrates a vehicle road speed control system having a valve assembly embodying the invention.

FIGURE 2 is an exploded isometric view of the valve assembly of FIGURE 1 embodying the invention and the adjustable mounting structure for the valve assembly.

FIGURE 3 is a cross section view of the valve assembly embodying the invention, with parts broken away.

FIGURE 4 is a cross section view of the valve assembly of FIGURE 3, taken in the direction of arrows 4—4 of that figure.

The engine 10 of a motor vehicle is schematically illustrated as having an intake manifold 12 to which is connected a carburetor 14 having a throttle valve 16, the shaft of which is shown extending out of the carburetor body. The vehicle is also schematically illustrated as having a transmission 18 with a vehicle speed pickup cable 20 connected to be driven by the transmission output shaft 22. The vehicle is also provided with a source of electricity such as battery 24, a brake pedal 26 mounted on a brake pedal arm 28, suitable throttle valve control linkage 30 connected for manual operation by the throttle valve 16, a differential pressure servomotor 32 connected by suitable linkage such as bead chain 34 to the throttle linkage 30 to operate the throttle valve 16, an ignition switch 36, a three-position manually-operated switch 38, and a speed transducer assembly 40, which receives a vehicle speed signal through cable 20 and transmits this signal to the vehicle speedometer through the output cable 42.

The transducer assembly 40 is electrically connected to the holding circuit 44 and to the activation circuit 46, which circuits are also connected to switch 38, and is electrically grounded at 48. The transducer assembly is connected by conduits 50 to the engine intake manifold 12, by the conduit 52 to supply manifold vacuum to the servomotor 32, by conduit 54 to provide a speed error signal to the servomotor 32, and to a suitable atmospheric air inlet 56.

The servomotor 32 has a power wall 58 dividing the servomotor housing 60 into an atmospheric pressure chamber 62 and a variable pressure chamber 64. Chamber 64 is connected through a throttle position sensitive valve 66 to conduit 52 and is also connected to conduit 54. Conduit 68 connects conduit 54 and therefore chamber 64 to the vacuum release valve assembly 70. This assembly is held in the valve closed position by the brake pedal arm 28 when that arm is in the released position. At the same time, a normally closed switch 72, in series in the electrical circuit with the battery 24, the ignition switch 36, and the manual switch 38, is connected to the brake pedal arm 28 so as to be opened when the brake pedal is moved in a brake applying direction.

The valve assembly 70 and the means for mounting it are shown in greater detail in FIGURES 2 and 3. The mounting means includes a bracket 74 suitably secured to a part of the vehicle frame adjacent the brake pedal arm 28 and having an aperture 76 extending therethrough. A retainer 78 is mounted in the aperture 76. The retainer is held in position by a flange 80 and suitable tabs 82, as is best seen in FIGURE 3. The retainer is generally cylindrically formed and the portion opposite flange 80 has spring ratchet arms 84 formed to provide detents 86. The valve assembly 70 has an elongated valve body 88 with the outer surface thereof being provided with ridges 90 separated by depressions 92. When the valve body is inserted into the retainer 76 and moved to the right, as seen in the drawing, the detents 86 will engage adjacent ridges and extend into the depression therebetween so as to resist axial or rotary movement of the valve body. It can be seen that a sufficient axial adjustment of the valve body may be obtained by positioning the detents 86 in appropriate depressions 92. The ridges 90 may be annular ridges or may be formed as helical threads. When formed as threads the ridges may be rotated relative to detents 86 by rotating the valve body 88 to obtain a finer adjustment.

The valve body 88 has a bore 94 extending therethrough with the larger section thereof providing a chamber 96 and a smaller section thereof providing the valve chamber 98. A cap 100 is secured by suitable means such as screws 102 to the end of the valve body forming valve chamber 98. The annular valve seat 104 is positioned between the cap 100 and the valve body 88 and also acts as a gasket. An air inlet cross passage 106 is formed in the end of the valve body 88 and connects with the valve chamber 98. Passage 106 is directly connected with atmospheric air pressure. The cap 100, which when assembled may be considered to be a part of body 88, has an outlet passage 108 extending therethrough and through the valve seat 104 to connect with chamber 98. Conduit 68 is connected to passage 108.

The valve 110 is preferably formed as a cup with a cavity or recess 112 closed at one end to provide a valve head 114, which is in valve seating alignment with the seat 104. The valve section 116 in which cavity 112 is formed is reciprocably received in the valve chamber 98 so as to seal the end of that chamber opposite outlet passage 108. Another valve section 118 is of larger diameter than the valve section 116 and is joined thereto by a shoulder 120. Section 118 is reciprocably received in the larger bore chamber 96. The end of the valve opposite the valve head 114 is provided with an inturned flange 122, which may be formed after parts of the valve assembly have been put together. A valve control member 124 includes a plunger section 126 reciprocably received within the valve cavity 112 and an enlarged land 128 reciprocably received within the valve section 118 and having the outer side thereof engageable with valve flange 122. The outer end of member 124 is formed as button 130 and extends outwardly of the valve body 88. A stop such as snap ring 132 is provided in the end of bore 94 against which flange 122 may seat. A spring 134 is received in bore chamber 96 about the valve section 116 with one end seating on the valve body shoulder 136 and the other end seating on the valve shoulder 120. Another spring 138 is received in bore chamber 96 within the valve section 118 and has one end seated on valve shoulder 120 and the other end seated on valve control member land 128. In the position shown in FIGURE 3 both springs have a preload thereon, with the spring 138 having the greater preload and being the stronger spring.

The valve assembly is shown in FIGURE 3 in the position wherein the brake pedal arm 28 is disengaged from the control member button 130. The valve therefore connects the fluid pressure inlet passage 106 to the fluid pressure outlet passage 108 through the valve chamber 98. When the valve assembly is installed in the proper relation to the brake pedal arm 28 and the arm is in the brake released position, the arm engages button 130 and moves the control member leftwardly as seen in FIGURE 3 to further compress springs 134 and 138, also moving the valve 110 to the left until the valve head 114 seats on the valve seat 104 and therefore disconnects the inlet passage 106 from the outlet passage 108. Under this condition of operation, it can be seen that subatmospheric pressure may be provided in the servomotor variable pressure chamber to control the throttle valve 16 in accordance with vehicle speed error, as determined by the speed transducer assembly 40, and signalled to the servomotor 32 through conduit 54.

When it is desired to deactivate the speed control system, the brake pedal may be depressed to open switch 72. Movement of the brake pedal in this direction will also permit movement of the valve control member 124 to the right, as seen in FIGURE 3. Since spring 138 has the greater preload and is the stronger spring, valve 110 will not move until some of the preload force on spring 138 as exerted by land 128 is removed. At some point in the outward movement of control member 124, the spring 134 will also expand, causing valve head 114 to become unseated from valve seat 104. This position is determined by the spring forces, and may be correlated with the desired amount of brake pedal arm movement by proper adjustment of the valve body 88 in the retainer 76. It can thus be seen that some movement of the brake pedal may be permitted before the valve permits fluid flow through the chamber 98, and that additional movement of the valve control member may be accomplished relative to movement of the valve 110 in either the opening or closing direction.

I claim:

1. A fluid control valve assembly adapted to be actuated by movement of a control member such as a brake pedal or the like and requiring mounting with quick and accurate adjustment relative to the control member for actuation after a predetermined amount of permissive movement of the control member, said assembly comprising:

a valve body having a valve chamber and a fluid inlet and a fluid outlet and a valve seat;

a valve reciprocably received in said valve chamber and cooperating with said valve seat to control fluid flow between said fluid inlet and said fluid outlet;

means releasably holding said valve seated on said valve seat and movable upon release through a first range of movement away from said valve seat while continuing to hold said valve seated on said valve seat and a second continuing range of movement away from said valve seat to move said valve away from said valve seat;

and mounting means for mounting said valve assembly adjacent and in actuatable relation with a control member for controlling the movement of said releasable holding means, said mounting means including a mounting bracket, a series of annular ridges having depressions therebetween externally formed on said valve body, and spring detent means secured to said bracket and receiving the ridged portion of said valve body therethrough and having a spring detent yieldably engaging adjacent ridges and holding said valve body in a desired position relative to said bracket while permitting said valve body to be moved in said spring detent means to vary the position of said valve body relative to said bracket.

2. In the fluid control valve assembly of claim 1, said series of annular ridges externally formed on said valve body being formed as helical threads, said spring detent means allowing linear movement of said valve body therethrough in a ratcheting manner and allowing rotational movement of said valve body to obtain a linear component of movement for fine adjustment of valve body position relative to said bracket.

3. A fluid control valve assembly comprising:

a valve body having a valve chamber and a fluid inlet and a fluid outlet and a valve seat;

a valve reciprocably received in said valve chamber and cooperating with said valve seat to control fluid flow between said fluid inlet and said fluid outlet, said valve being a cylindrically formed member having a first cylindrical section slidably engageable with the wall of said valve chamber and a second cylindrical section having a smaller diameter than said first cylindrical section and joined thereto by an annular shoulder and having a closed end forming the valve portion engaging said valve seat;

and means releasably holding said valve seated on said valve seat and movable upon release through a first range of movement away from said valve seat while continuing to hold said valve seated on said valve seat and a second continuing range of movement away from said valve seat to move said valve away from said valve seat, said releasable holding means including a plunger received within said valve first and second cylindrical sections, said valve first cylindrical section having the end opposite said shoulder providing stop means for said plunger, a first spring received within said valve first cylindrical section and surrounding said plunger and seated on said valve shoulder and an enlarged portion of said plunger engageable with said stop means, and a second spring surrounding said valve second cylindrical section and seated on said valve shoulder and one end of said valve chamber.

References Cited

UNITED STATES PATENTS

| | | | |
|---|---|---|---|
| 1,425,412 | 8/1922 | Norwood | 251—80 |
| 1,545,990 | 7/1925 | Weeks | 251—80 |
| 3,229,721 | 1/1966 | Bingel | 251—80 |

ROBERT W. MICHELL, *Primary Examiner.*

LEON G. MACHLIN, *Assistant Examiner.*

U.S. Cl. X.R.

251—295, 322